United States Patent Office 3,091,728
Patented May 28, 1963

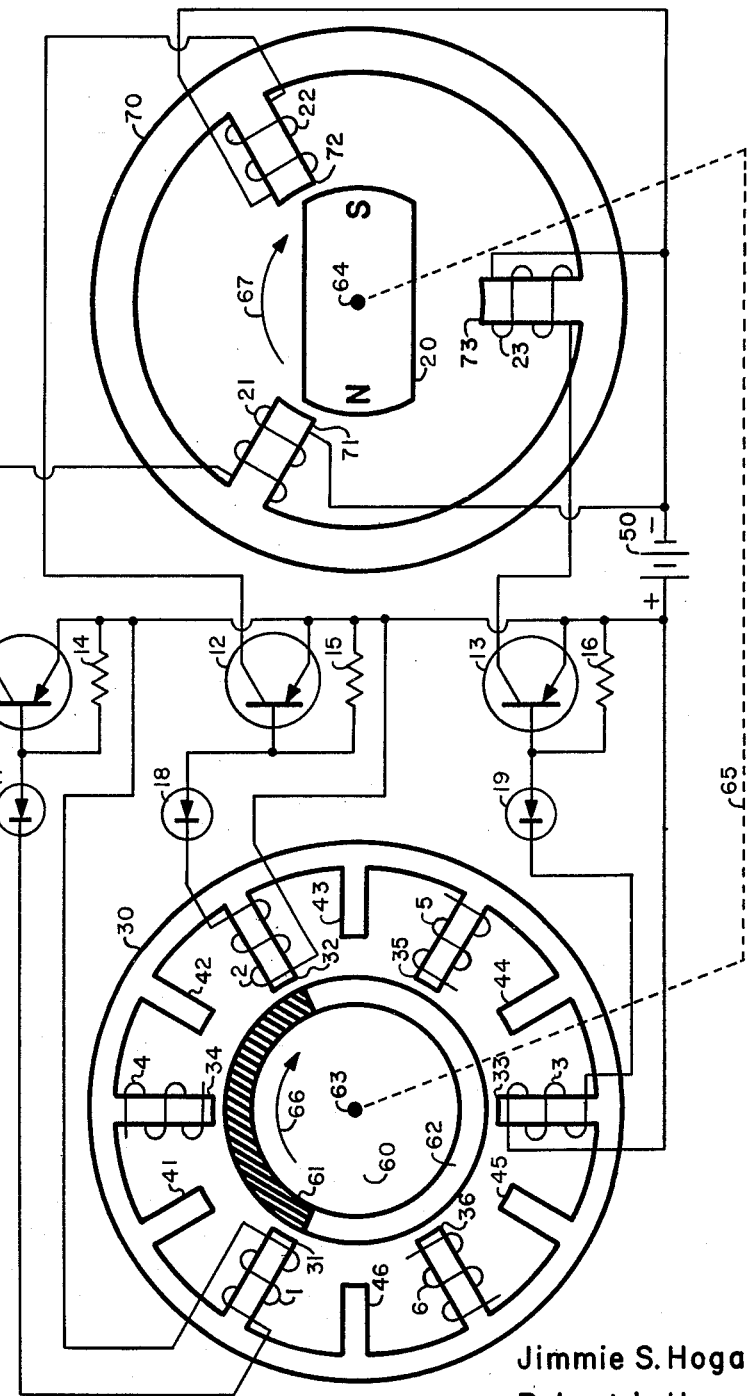

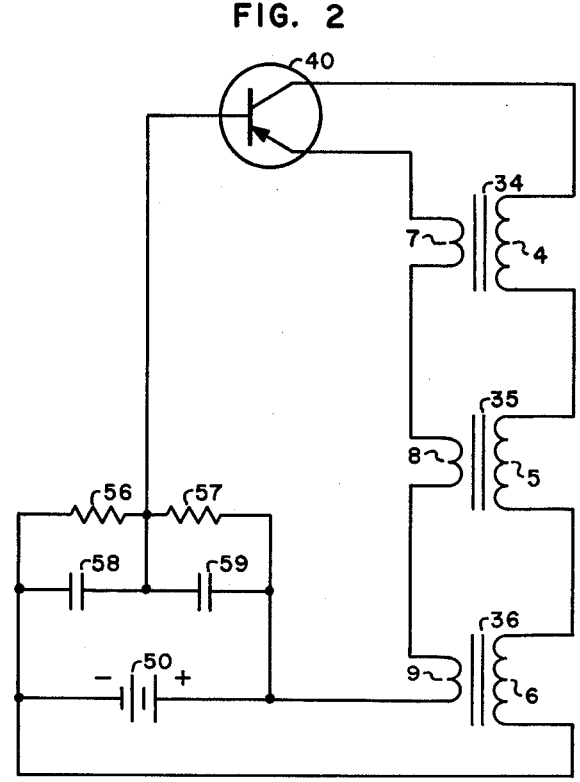

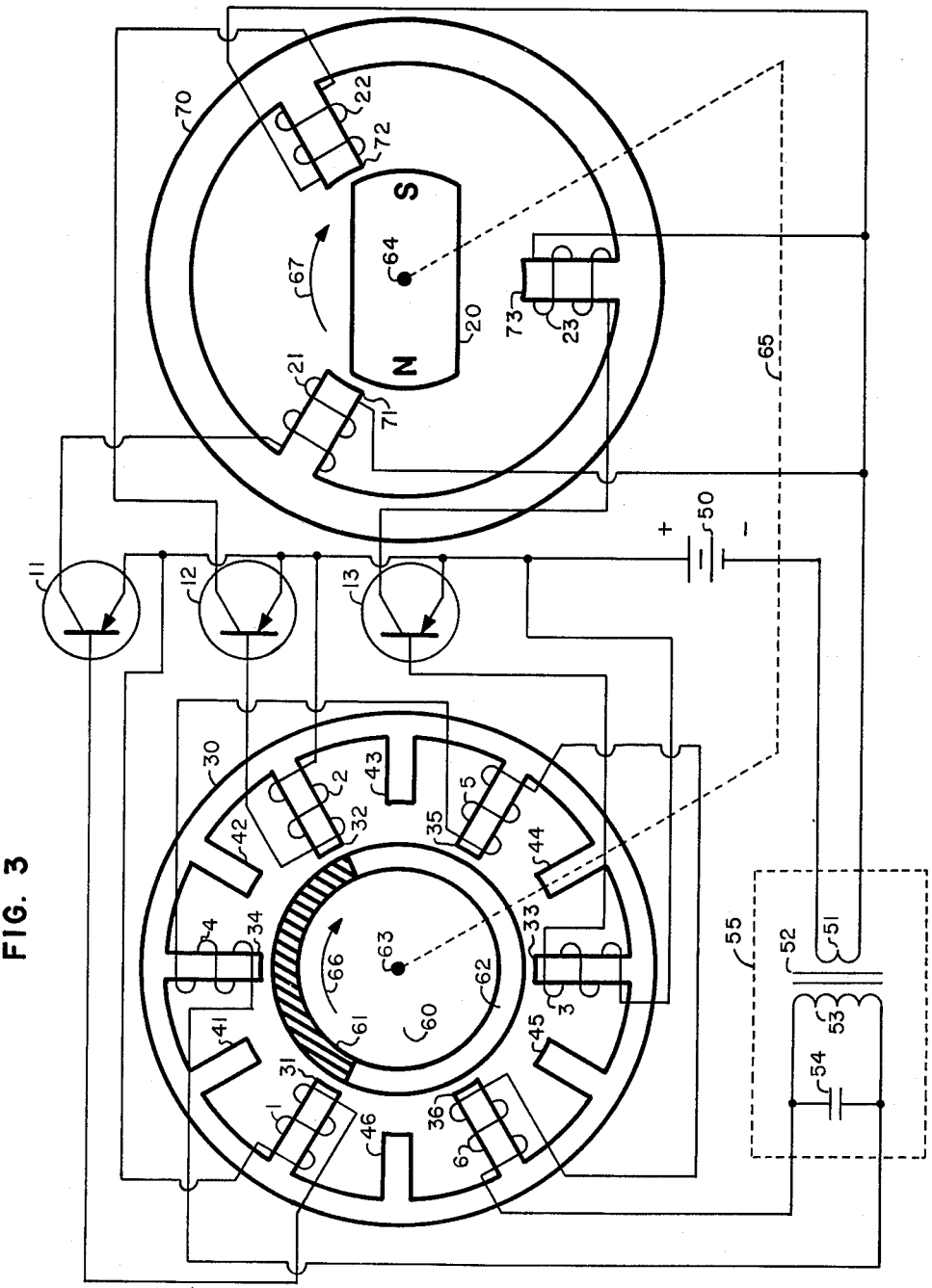
Jimmie S. Hogan
Robert L. Hogan
INVENTORS

3,091,728
ELECTRIC MOTORS
Jimmie S. Hogan and Robert L. Hogan, both of Houston, Tex.; said Robert L. Hogan assignor to said Jimmie S. Hogan
Filed May 17, 1961, Ser. No. 110,798
12 Claims. (Cl. 318—138)

The present invention relates to electric motors and more particularly to brushless direct current type motors.

More particularly still the present invention relates to an electric motor that utilizes a permanent magnet rotor and an electronic commutator that selectively energizes the proper field coil to provide a self-starting motor with a selective direction of rotation without the need of brushes.

The copending application Serial No. 101,474, filed on April 7, 1961, discloses an electronic commutator for brushless commutation. The invention of this instant utilizes the circuits of that application, as well as others, and a permanent magnet rotor is utilized with field coils to give a three-phase effect for self-starting in a definite direction of rotation.

Additionally, the copending application Serial No. 800,312, filed on March 18, 1959, discloses a commutatorless D.C. motor comprising a permanent magnet rotor and field coils that do not contain a core structure. That coreless type motor could be used for devices, such as aircraft gyro instruments, wherein the motor rotor has freedom about its axis, but a satisfactory electronic means was not disclosed for self-starting that motor or for assuring a pre-selected direction of rotation. The invention of this instant, which assures self-starting and a pre-selected direction of rotation, could be used with the coreless features of that motor for an improved motor.

At the present time, direct current motors requiring brushes have many disadvantages. Brushes limit the rotational speed of brush motors as well as decrease the efficiency due to friction losses. Motors requiring the use of brushes are also subject to arcing or sparking which is hazardous. Brushes and the associated commutator parts of a motor are also subject to wear, contamination, and general unreliability requiring special maintenance since they require physical contact with the movable body.

An object of the present invention is to provide a brushless D.C. motor that overcomes many of the objections of present-day D.C. motors.

A further object of the present invention is to provide a self-starting brushless D.C. motor.

Still a further object of the present invention is to provide a self-starting brushless D.C. motor that rotates in a fixed direction of rotation.

Still a further object of the present invention is to provide a self-starting brushless D.C. motor wtih a reversible direction of rotation.

Other objects and advantages of the present invention will become more readily apparent from a consideration of the following description and drawings wherein:

FIGURE 1 schematically illustrates one form of the present invention and the electrical circuit therefor.

FIGURE 2 schematically illustrates one form of the commutator oscillator component of the present invention.

FIGURE 3 schematically illustrates a second form of the present invention and the electrical circuit therefor.

Attention is directed to FIGURE 1 of the drawings wherein the motor rotor is shown at 20. The rotor 20 is permanently magnetized diametrically to the rotor axis and provided with a north magnetic pole shown at N and a south magnetic pole shown at S. A commutator rotor is shown at 60 and is provided with a ferromagnetic section shown at 61 and a magnetic shielding section shown at 62. Commutator rotor 60 and motor rotor 20 are provided with shafts shown at 63 and 64 respectively. Shafts 63 and 64 are suitably mounted for rotation but such mounting is not shown in detail it being assumed that suitable mountings can be provided. Shafts 63 and 64 are connected as indicated by line 65 so that the two shafts rotate together; in fact, the two shafts may be a common shaft with motor rotor 20 and commutator rotor 60 mounted on such common shaft.

The motor of FIGURE 1 is provided with a motor structure made of ferromagnetic material shown at 70 with structure poles shown at 71, 72, and 73. The structure poles are equally spaced about the structure, as shown, similar to standard three-phase motor construction. Motor structure poles 71, 72, and 73 are provided with field coils 21, 22, and 23 respectively, as shown.

The commutator rotor 60 is encircled by a commutator structure, made of ferromagnetic material, shown at 30. Commutator structure 30 is provided with pickup arms 31, 32, and 33, oscillator arms 34, 35, and 36, and magnetic shielding arms 41, 42, 43, 44, 45, and 46, all as shown in FIGURE 1 of the drawings. Pickup arms 31, 32, and 33 are provided with pickup coils 1, 2, and 3 respectively, as shown. Oscillator arms 34, 35, and 36 are provided with oscillator coils 4, 5, and 6 respectively, as shown. The various pickup arms, oscillator arms, and magnetic shielding arms are equally spaced about the commutator structure 30 encircling the commutator rotor 60, and like arms are not adjacent to each other; that is, oscillator arms are located on each side of the pickup arms and magnetic shielding arms are located between the oscillator and pickup arms.

In FIGURE 1, an electrical power source is represented by a battery as shown at 50; PNP power transistors are provided as shown at 11, 12, and 13; resistors are provided as shown at 14, 15, and 16; and rectifiers are provided as represented by the diodes shown at 17, 18, and 19.

Electrical conductors are shown in the drawings connecting various motor components but such conductors are not numbered individually since the connections and routings of such conductors are obvious to those skilled in the art from the drawing illustrations. In FIGURE 1, the positive terminal of battery 50 is connected by electrical conductors to the emitters of transistors 11, 12, and 13, as shown; the collectors of transistors 11, 12 and 13 are connected to field coils 21, 22, and 23 respectively, and the other end of field coils 21, 22, and 23 are connected to the negative terminal of battery 50, as shown; the emitters and bases of transistors 11, 12, and 13 are biased by resistors 14, 15, and 16, as shown; and pickup coils 1, 2, and 3 are connected between the positive terminal of battery 50 and the bases of transistors 11, 12, and 13 respectively with diodes 17, 18, and 19 respectively connected in series between the bases of transistors 11, 12, and 13 and pickup coils 1, 2, and 3, as shown.

Oscillator coils 4, 5, and 6 are connected to a source of electrical oscillations. It is optional whether or not oscillator coils 4, 5, and 6 are connected in series or parallel with each other; however, inventors have usually connected the oscillator coils in series as indicated by oscillator coils 4, 5, and 6 in FIGURE 2. The oscillators are not shown in FIGURE 1, this being reserved for FIGURE 2 and more detailed description of the oscillator later in these specifications. For further description of the operation of the motor shown in FIGURE 1, it is assumed that oscillator coils 4, 5, and 6 are permanently connected to a source of continuous electrical oscillations.

The motor shown in FIGURE 1 of the drawings therefore operates as follows:

Oscillator coils 4, 5, and 6 induce magnetic oscillations in oscillator arms 34, 35 and 36 respectively. The preferred path of these magnetic oscillations is between the various oscillator arms and their adjacent magnetic shielding arms. Thus, pickup arms 31, 32, and 33 do not normally receive magnetic oscillations of the oscillator arms. However, whenever the ferromagnetic section 61 of commutator rotor 60 is adjacent to a pickup arm, section 61 conveys magnetic oscillations from an oscillator arm to such adjacent pickup arm. For example, pickup arms 31 and 32 in the position shown by FIGURE 1 receive oscillations from oscillator arm 34 since section 61 is adjacent to both pickup arms 31 and 32 and also adjacent to oscillator arm 34 from which to convey the magnetic oscillations. However, in the position shown in FIGURE 1, pickup arm 33 does not receive magnetic oscillations from adjacent oscillator arms 35 or 36 since adjacent magnetic shielding arms 44 and 45 provide a preferred path for such magnetic oscillations and additionally, magnetic shielding section 62 is adjacent to pickup arm 33. Thus, it can now be appreciated that section 61 conveys magnetic oscillations from the various oscillator arms to whichever pickup arms it is adjacent and it is readily apparent from the drawings that section 61 is always adjacent to at least one pickup arm and is never adjacent to more than two pickup arms.

The magnetic oscillations received by the pickup arms, when conveyed from oscillator arms by ferromagnetic section 61, induces electrical oscillations in their respective pickup coils. The induced electrical oscillations in the pickup coils are used to switch the associated pickup coil transistor. More particularly, when ferromagnetic section 61 is adjacent to pickup arm 31, magnetic oscillations are conveyed from oscillator arm 34 and/or arm 36 and electrical oscillations are induced in pickup coil 1 which, in turn, switches transistor 11 to a conductive state; when ferromagnetic section 61 is adjacent to pickup arm 32, magnetic oscillations are conveyed from oscillator arm 34 and/or arm 35 and electrical oscillations are induced in pickup coil 2 which, in turn, switches transistor 12 to a conductive state; and, when ferromagnetic section 61 is adjacent to pickup arm 33, magnetic oscillations are conveyed from oscillator arm 35 and/or arm 36 and electrical oscillations are induced in pickup coil 3 which, in turn, switches transistor 13 to a conductive state.

It is noted that transistors 11, 12, and 13 are normally in an off state since their emitters and bases are biased to off by resistors 14, 15, and 16 respectively. That is, when electrical oscillations are not induced in the pickup coils, the associated pickup coil transistor is non-conductive. Diodes 17, 18, and 19 are provided to rectify their associated pickup coil electrical oscillations that are impressed on their associated transistor so that the various transistors conduct in a relatively steady state. The motor of FIGURE 1 will operate diodes 17, 18, and 19, but without the diodes, a pulsative D.C. type current is allowed to flow to the field coils which makes an inferior type motor in some instances. Therefore, with the diodes in the circuit as shown by FIGURE 1, the various transistors conduct continuously when their associated pickup coils receive the electrical oscillations. More particularly, a continuous current is allowed to flow through field coil 21 by transistor 11 when electrical oscillations are received by pickup coil 1; a continuous current is allowed to flow through field coil 22 by transistor 12 when electrical oscillations are received by pickup coil 2; and a continuous current is allowed to flow through field coil 23 by transistor 13 when electrical oscillations are received by pickup coil 3.

When field coils 21, 22, and 23 are energized, structure poles 71, 72, and 73 respectively are accordingly induced with a magnetic flux and the polarity of this flux is such that the end of the structure pole nearest the rotor center becomes a south magnetic pole; when one of the structure poles is not electrically magnetized by its associated field coil, then the end of the structure pole nearest the rotor center becomes a north magnetic pole due to the energization of one of its adjacent field coils. More particularly, when field coil 21 is energized, the end of structure pole 71 nearest rotor 20 becomes a south magnetic pole, but when field coil 21 is not energized then field coil 22 and/or field coil 23 is energized and accordingly, the end of structure pole 71 nearest rotor 20 becomes a north magnetic pole; when field coil 22 is energized, the end of structure pole 72 nearest rotor 20 becomes a south magnetic pole, but when field coil 22 is not energized then field coil 21 and/or field coil 23 is energized and accordingly, the end of structure pole 72 nearest rotor 20 becomes a north magnetic pole; and when field coil 23 is energized, the end of structure pole 73 nearest rotor 20 becomes a south magnetic pole, but when field coil 23 is not energized then field coil 22 and/or field coil 21 is energized, and accordingly, the end of structure pole 73 nearest rotor 20 becomes a north magnetic pole.

With the motor rotor 20 and the commutator rotor 60 in the positions shown by FIGURE 1, the ends of structure poles 71 and 72 nearest rotor 20 become south magnetic poles since field coils 21 and 22 are energized, and the end of structure pole 73 nearest rotor 20 becomes a north magnetic pole since field coil 23 is not energized and accordingly, a torque is imparted on rotor 20 in a clockwise direction as indicated by arrow 67 since like magnetic poles repel each other and unlike magnetic poles attract each other. This torque causes motor rotor 20 to rotate in clockwise direction 67 and accordingly, commutator rotor 60 then also rotates in a clockwise direction as indicated by arrow 66 since the two rotors are coupled as indicated by line 65.

It can readily be seen therefore by FIGURE 1 of the drawings that the position of commutator rotor 60 switches selected transistors and selectively energizes the motor field coils so that a continuous torque is imparted on rotor 20 in a clockwise direction. More particularly, as indicated by FIGURE 1, the south pole S of rotor 20 while rotating in clockwise direction 67 has just passed structure pole 72 and accordingly, the end of structure pole 72 nearest rotor 20 has just been induced with a south magnetic pole to repel rotor 20 south pole S and thus impart a clockwise torque on rotor 20; this is caused by section 61 simultaneously moving adjacent to pickup arm 32 as rotor 20 south pole S passes structure pole 72; this will continue until just before rotor north pole N reaches structure pole 72 when section 61 simultaneously passes pickup arm 32 and the electric current is cut off from field coil 22; after the north pole N of rotor 20 has passed structure pole 72, and the current has accordingly been cut off from field coil 22, the end of structure pole 72 nearest rotor 20 is built up to a north magnetic pole by adjacent field coils and a clockwise torque is still imparted to rotor 20; this same sequence of events is followed by structure poles 71 and 73.

In summation of the motor operation as illustrated by FIGURE 1 of the drawings, a clockwise torque 67 is continuously imparted to motor rotor 20 by motor structure poles 71, 72, and 73 since commutator rotor 60 rotates in clockwise direction 66 together with motor rotor 20 and controls transistors 11, 12, and 13 by ferromagnetic section 61 and selectively allows the transistors to energize field coils 21, 22, and 23 in the proper phase with such motor rotor rotation.

For illustrative purposes the operation of the motor of FIGURE 1 was described with the ends of structure poles 71, 72, and 73 nearest rotor 20 being induced with a south magnetic pole when their associated field coil was energized. If the terminals of the field coils are reversed so that all of the ends of the structure poles nearest the rotor become a north magnetic pole when energized by their associated field coils, then the motor will operate equally well but the direction of rotation will be reversed. Therefore, double pole switches can be provided on the field coil terminals and the rotational direction of the motor can thus be reversed easily.

Inventors have found the "three-phase type" motor structure as illustrated by FIGURE 1 to be a very practical type construction for the present invention. However, it can be appreciated that any number of structure poles can be provided for the motor structure and that the detail shape and form of the motor structure can vary considerably in accordance with current motor structure know-how without departing from the scope of the present invention. In other words, one could readily make a six-phase motor by providing six field coils, six transistors, and an electronic commutator with six pickup arms suitably arranged to properly control the transistors, all without departing from the scope of the present invention. It can also be appreciated that an infinite number of motor rotor magnetic pole arrangements can also be provided to match whichever motor structure is used without departing from the present invention.

The motor of FIGURE 1 operates in a "part cycle" manner. That is, the field coils are not energized for the full rotor cycle although the field poles give such effect. This can easily be changed to a "push-pull" type operation by providing additional transistors so that the field coils are energized with a first polarity for the first portion of the rotor rotation and additional transistors are provided to reverse the polarity of the field coils for the second portion of the rotor rotation. "Push-pull" type operation is helpful for some motor applications. It is possible for a two-phase type motor with a "part cycle" type circuit as illustrated by FIGURE 1 to be stopped initially in a position where the commutator rotor ferromagnetic section is not adjacent to a pickup arm and thus the motor would not be self-starting. With a "push-pull" type circuit however, even a two-phase type motor would always be self-starting since there would always be at least one transistor conducting.

The circuit of FIGURE 1 was selected to best illustrate the basic operation of the present invention. In actual practice however, inventors have found that the transistors as shown can be used to control larger power transistors which results in better control for certain applications. It can also be appreciated that NPN type transistors, tubes, or other type semi-conductors or switching devices can be used to control the current to the field coils without departing from the present invention.

The detail structure of commutator rotor 60 can vary considerably. Inventors have found that one simple way of fabricating the commutator rotor is to use a thin strip of iron for the ferromagnetic section 61 and a thin strip of copper for the magnetic shielding section 62. The ends of the iron and copper strips are soldered together to form a circular band and this band is slipped over the commutator rotor 60 which is a circular rotor made of plastic or similar material.

Inventors have also found that the magnetic shielding section 62 is helpful to control the motor operation but that it is not absolutely necessary to operate the motor.

Inventors have also found that the entire commutator rotor can be made of ferromagnetic material and that notches can be cut in the rotor edge to provide voids at the rotor periphery where magnetic conduction is not desired.

Attention is now directed to FIGURE 2 of the drawings wherein one form of a basic oscillator circuit is illustrated. It is again noted that the oscillator may be any electronic oscillator capable of inducing magnetic oscillations of adequate magnitude in the oscillator arms. The oscillation frequency may also vary considerably. Therefore, the oscillator of FIGURE 2 of the drawings is illustrated only to indicate one basic oscillator circuit.

In FIGURE 2, components are numbered the same as those of FIGURE 1 where they serve the same function. More particularly, oscillator coils 4, 5, and 6 of FIGURE 2 are the same, for illustrative purposes, as oscillator coils 4, 5, and 6 of FIGURE 1; oscillator arms 34, 35, and 36 of FIGURE 2 are the same as oscillator arms 34, 35, and 36 of FIGURE 1; and battery 50 of FIGURE 2 is the same as battery 50 of FIGURE 1. The circuit of FIGURE 2 is also provided with resistors 56 and 57, capacitors 58 and 59, coils 7, 8, and 9, and transistor 40.

The oscillator of FIGURE 2 is a basic oscillator circuit, readily recognizable by those skilled in the art, so the detail description of this oscillator operation is not considered necessary. It is noted, however, that coils 7, 8, and 9 are magnetically coupled to oscillator coils 4, 5, and 6, respectively, by oscillator arms 34, 35, and 36. This is generally accepted as a self-starting oscillator and the resistors and capacitors may be varied considerably in order to obtain the desired results.

Many varied oscillator arrangements can be used with the motor of FIGURE 1, but the oscillator of FIGURE 2 together with the motor and components of FIGURE 1 constitutes a complete brushless D.C. motor representing one form of the present invention.

The form of invention illustrated by FIGURE 3 of the drawings is similar to that of FIGURE 1, with like components numbered the same, except that the oscillator means has been replaced by a control transformer shown at 55. The output to the field coils for this motor is a pulsative D.C. output and this pulsative current must travel through the control transformer primary shown at 51. Control transformer secondary coil shown at 53 is magnetically coupled to primary coil 51 by magnetic core 52. Secondary coil 53 therefore picks up the pulsations of coil 51 and transmits them in the form of electric oscillations to oscillator coils 4, 5, and 6; capacitor 54 is provided to intensify said oscillations.

It can therefore readily be seen that operation of the motor of FIGURE 3 is similar to that of the motor of FIGURE 1, and since like components are numbered the same, previous description given for the operation of the motor of FIGURE 1 should be referred to for the general details for the operation of the motor of FIGURE 3.

In summation of the motor operation as illustrated by FIGURE 3 of the drawings, current must flow through primary coil 51 when transistors 11, 12, and 13 are conductive. This current flow through primary coil 51 energizes secondary 53 which, in turn, conveys such electric state to oscillator coils 4, 5, and 6. The electric state of the oscillator coils is in turn magnetically conveyed by magnetic section 61 to whichever pickup coil it is adjacent to. The pickup coils adjacent to magnetic section 61, in turn, control their associated transistors. In general, the circuit of FIGURE 3 is a self-oscillating circuit (it is noted that diodes are not used in the transistor base circuits), so the transistors conduct in pulses and the electric state impressed on oscillator coils 4, 5, and 6 is in the form of electric oscillations. Therefore, a clockwise torque 67 is imparted by continuous pulses to motor rotor 20 by motor structure poles 71, 72, and 73 since commutator rotor 60 rotates in clockwise direction 66 together with motor rotor 20 and controls transistors 11, 12, and 13 by ferromagnetic section 61 and selectively allows the transistors to energize field coils 21, 22, and 23 with pulsative D.C. current in the proper phase with such motor rotor rotation.

What is claimed is:

1. An electric motor comprising field coils suitably mounted for generating magnetic fields in selected areas, a permanently magnetized rotor suitably mounted for rotation within said magnetic fields, a power source including switching means for selectively energizing said field coils, pickup means for receiving an induced electric current to control said switching means, means to induce a current in said pickup means, and means suitably mounted for rotation with said rotor for controlling said pickup means.

2. An electric motor comprising field coils suitably mounted for generating magnetic fields in selected areas, a permanently magnetized rotor suitably mounted for rotation within said magnetic fields, a power source including switching means for selectively energizing said field coils, pickup means for receiving an induced electric current to control said switching means, oscillator means to induce an electric current in said pickup means, and means for magnetically coupling said pickup means with said oscillator means; said magnetic coupling means is suitably mounted for rotation with said rotor and associated with said pickup means so that said pickup means receives said induced current during selected positions of said rotor.

3. An electric motor comprising field coils suitably mounted for generating magnetic fields in selected fixed areas; a permanently magnetized rotor suitably mounted for rotation within said magnetic fields; a source of direct current for energizing said field coils; switching means connecting said field coils individually to said direct current to selectively energize said field coils separately to selectively generate said magnetic fields to impart a continuous torque on said rotor; oscillator means for producing an alternating current; and means magnetically coupling said alternating current to said switching means to selectively induce a current in selected switches of said switching means to control said switching means and rotate said rotor in a pre-selected direction.

4. The combination recited in claim 3 wherein the oscillator means comprises a transformer and means suitably connecting said field coils, said power source, and said transformer so that an alternating current is produced in the secondary of said transformer.

5. An electric motor comprising field coils suitably mounted for generating magnetic fields in selected fixed areas; a permanently magnetized rotor suitably mounted for rotation within said magnetic fields; a source of direct current for energizing said field coils; switching means connecting said field coils individually to said direct current to selectively energize said field coils separately to selectively generate said magnetic fields to impart a continuous torque on said rotor; oscillator means for inducing a current in said switching means to control said switching means; and means magnetically coupled with said oscillator means and said switching means to control selected switches of said switching means for selected positions of said rotor to rotate said rotor in a pre-selected direction.

6. An electric motor comprising field coils suitably mounted for generating magnetic fields in selected fixed areas; a permanently magnetized rotor suitably mounted for rotation within said magnetic fields; a source of direct current for energizing said field coils; switching means connecting said field coils individually to said direct current to selectively energize said field coils separately to selectively generate said magnetic fields to impart a continuous torque on said rotor; oscillator means for inducing a current in said switching means to control said switching means; magnetic coupling means made of ferromagnetic material suitably mounted in a fixed position to magnetically couple said oscillator means and said switching means; and a rotary element including a ferromagnetic section suitably mounted to rotate with said rotor and suitably coupled magnetically with said magnetic coupling means to control said switching means by controlling said magnetic coupling means to rotate said rotor in a pre-selected direction.

7. The combination recited in claim 6 wherein the oscillator means comprises a transformer and means suitably connecting said field coils, said power source, and said transformer so that an alternating current is produced in the secondary of said transformer.

8. An electric motor comprising field coils suitably mounted for generating magnetic fields in selected fixed areas; a permanently magnetized rotor suitably mounted for rotation within said magnetic fields; a source of direct current for energizing said field coils; switching means connecting said field coils individually to said direct current to selectively energize said field coils separately to selectively generate said magnetic fields to impart a continuous torque on said rotor; oscillator means for producing an alternating current; magnetic coupling means made of ferromagnetic material suitably mounted in a fixed position to magnetically couple said alternating current and said switching means to control said switching means; and a rotary element including a ferromagnetic section suitably mounted to rotate with said rotor and suitably coupled magnetically with said magnetic coupling means to control said switching means to energize selected field coils for selected positions of said rotor element to impart a continuous torque of pre-selected direction on said rotor to rotate said rotor in a pre-selected direction.

9. An electric motor comprising field coils suitably mounted for generating magnetic fields in selected fixed areas; a permanently magnetized rotor suitably mounted for rotation within said magnetic fields; a source of direct current for energizing said field coils; switching means connecting said field coils individually to said direct current to selectively energize said field coils separately to selectively generate said magnetic fields to impart a continuous torque on said rotor; oscillator means for producing an alternating current; magnetic coupling means made of ferromagnetic material to magnetically couple said switching means with said alternating current to control said switching means, and magnetic shielding means to shield said switching means from the control of said alternating current by providing a preferred magnetic path for the magnetic field of said alternating current; and a rotary element including a ferromagnetic section suitably mounted to rotate with said rotor and suitably coupled magnetically with said magnetic coupling means to selectively control said switching means by bypassing said magnetic shielding means for selected positions of said rotor to impart a continuous torque of preselected direction on said rotor to rotate said rotor in a pre-selected direction.

10. The combination recited in claim 9 wherein the oscillator means comprises a transformer and means suitably connecting said field coils, said power source, and said transformer so that an alternating current is produced in the secondary of said transformer.

11. An electric motor comprising field coils suitably mounted for generating magnetic fields in selected fixed areas; a permanently magnetized rotor suitably mounted for rotation within said magnetic fields; switching means for selectively energizing said field coils including a power source, a plurality of transistors, resistors, diodes, and control coils, and electrical conductors suitably connecting the named components of said field coils and said switching means so that said transistors are controlled by said control coils to selectively energize said field coils with said power source when a current is induced in said control coils; oscillator means including a power source, at least one transistor, at least one resistor, a plurality of oscillator coils and control coils, and electrical conductors suitably connecting the named components of said oscillator means so that a continuous oscillating current is induced in said oscillator coils; magnetic coupling means to magnetically couple said oscillator coils to the control coils of said switching means, said magnetic coupling means including magnetic shielding means to shield the control coils of said switching means from said oscillator coils by providing preferred magnetic paths so that an oscillating current is not normally induced in any of the control coils of said switching means by the oscillations of any of said oscillator coils; and rotatable means suitably mounted to rotate with said rotor including a section of ferromagnetic material to cancel the effect of said shielding means so that the control coils of said switching means are selectively induced with an oscillating current by said oscillator coils when said rotatable means is in selected positions.

12. The combination recited in claim 11 wherein the switching means does not include diodes or resistors and the transistors of said switching means energize said field coils with a pulsative current when the control coils of said switching means are selectively induced with an oscillating current.

References Cited in the file of this patent
UNITED STATES PATENTS
2,980,839     Haeussermann     Apr. 18, 1961